(12) United States Patent
Linder et al.

(10) Patent No.: US 9,930,869 B2
(45) Date of Patent: Apr. 3, 2018

(54) STACKABLE PACKAGE AND SYSTEM FOR HOLDING AND TRANSPORTING HONEYBEES

(71) Applicants: Charles Linder, Flora, IL (US); Bryan S. Claerhout, Hesston, KS (US)

(72) Inventors: Charles Linder, Flora, IL (US); Bryan S. Claerhout, Hesston, KS (US)

(*) Notice: Subject to any disclaimer, the term of this patent is extended or adjusted under 35 U.S.C. 154(b) by 179 days.

(21) Appl. No.: 14/547,766

(22) Filed: Nov. 19, 2014

(65) Prior Publication Data
US 2015/0140897 A1 May 21, 2015

Related U.S. Application Data

(60) Provisional application No. 61/906,161, filed on Nov. 19, 2013.

(51) Int. Cl.
*A01K 49/00* (2006.01)

(52) U.S. Cl.
CPC ................... *A01K 49/00* (2013.01)

(58) Field of Classification Search
CPC ........ A01K 49/00; A01K 47/00; A01K 47/06; A01K 53/00; A01K 1/0035; A01K 1/0236; A01K 1/0245; A01K 31/002; A01K 31/07; A01K 31/08; B65D 11/1893; B65D 11/188; B65D 11/1866
See application file for complete search history.

(56) References Cited

U.S. PATENT DOCUMENTS

| | | | | | |
|---|---|---|---|---|---|
| 32,357 | A | * | 5/1861 | Cutler | A01K 47/00 449/27 |
| 1,353,137 | A | * | 9/1920 | Ault | A01K 49/00 449/28 |
| 1,357,519 | A | * | 11/1920 | Russell | B65D 5/68 229/125.32 |
| 1,482,468 | A | * | 2/1924 | Hershiser | A01K 49/00 449/28 |
| 1,556,254 | A | * | 10/1925 | Short | A01K 49/00 449/28 |
| 2,316,457 | A | * | 4/1943 | Royce | B65D 5/68 229/125.28 |

(Continued)

FOREIGN PATENT DOCUMENTS

| | | | | | |
|---|---|---|---|---|---|
| BE | 835797 | * | 3/1976 | | B65D 11/188 |
| DE | 1486241 | A1 * | 5/1969 | | B65D 11/188 |

(Continued)

*Primary Examiner* — Kathleen I Alker
(74) *Attorney, Agent, or Firm* — Matthews Edwards LLC

(57) ABSTRACT

A package and system for holding and transporting small living beings, particularly, insects such as honeybees and the like, configurable in a robust, sturdy three-dimensional shape for handling and transport by mail and commercial carriers, which prevents stinging from within the package, allows escape of smaller accompanying insects such as hive beetles, is interlocking with others of the packages and strong enough to support other packages and items thereon; that provides for air flow through and about the package for heat dissipation for proper honeybee environment; that accommodates food and separately carrying a queen bee; and that can be easily and quickly broken down into a non-operational, generally flat configuration for initial sale, transport, and storage.

21 Claims, 17 Drawing Sheets

(56) References Cited

U.S. PATENT DOCUMENTS

| | | | | |
|---|---|---|---|---|
| 2,522,511 A * | 9/1950 | Hageman | A01K 47/00 | |
| | | | 449/10 | |
| 2,579,518 A * | 12/1951 | Schaefer | B65D 5/302 | |
| | | | 229/122 | |
| 2,925,933 A * | 2/1960 | Watson | B65D 11/188 | |
| | | | 220/573.1 | |
| 3,027,062 A * | 3/1962 | Huss | B65D 5/2047 | |
| | | | 229/114 | |
| 3,163,289 A * | 12/1964 | Laffkas | B65D 11/188 | |
| | | | 206/443 | |
| 3,478,722 A * | 11/1969 | Falcone, Jr. | A01K 31/14 | |
| | | | 119/431 | |
| 3,543,994 A * | 12/1970 | Clark | B65D 5/20 | |
| | | | 229/125.32 | |
| 3,760,970 A * | 9/1973 | Lutz | B65D 21/0215 | |
| | | | 206/511 | |
| 3,926,362 A * | 12/1975 | Beck | B65D 5/68 | |
| | | | 229/125.06 | |
| 4,217,984 A * | 8/1980 | Magnuson | B65D 85/672 | |
| | | | 206/403 | |
| 4,362,265 A * | 12/1982 | Williams | B65D 5/28 | |
| | | | 220/4.24 | |
| 4,402,099 A * | 9/1983 | Platt, Jr. | A01K 47/00 | |
| | | | 449/15 | |
| 4,444,354 A * | 4/1984 | Staelgraeve | B65D 5/28 | |
| | | | 206/459.5 | |
| 4,497,433 A * | 2/1985 | Wischusen, III | B65D 5/064 | |
| | | | 206/562 | |
| 4,508,237 A * | 4/1985 | Kreeger | B65D 11/182 | |
| | | | 206/509 | |
| 4,524,476 A * | 6/1985 | Adams, IV | A01K 47/00 | |
| | | | 449/27 | |
| 4,718,134 A * | 1/1988 | Ashby | A01K 57/00 | |
| | | | 449/28 | |
| 4,804,137 A * | 2/1989 | Harby | B65D 5/2047 | |
| | | | 220/23.4 | |
| 4,995,557 A * | 2/1991 | Fremion | B65D 5/6697 | |
| | | | 229/125.29 | |
| 5,060,851 A * | 10/1991 | Lorenz | B65D 5/2047 | |
| | | | 220/4.24 | |
| 5,160,081 A * | 11/1992 | Beales | B65D 5/2047 | |
| | | | 229/114 | |
| 5,195,595 A * | 3/1993 | Nakagawa | A62C 13/78 | |
| | | | 169/51 | |
| 5,199,589 A * | 4/1993 | Noble | B65D 19/18 | |
| | | | 217/15 | |
| 5,211,597 A * | 5/1993 | Scott | A01K 47/00 | |
| | | | 449/27 | |
| 5,501,351 A * | 3/1996 | Niles | B65D 11/10 | |
| | | | 206/303 | |
| 5,590,788 A * | 1/1997 | Inman | B65D 5/32 | |
| | | | 206/736 | |
| 5,630,545 A * | 5/1997 | Jaglowitz | B65D 5/321 | |
| | | | 229/122.21 | |
| 6,935,503 B2* | 8/2005 | Phan | B65D 5/2014 | |
| | | | 206/507 | |
| 7,721,566 B1* | 5/2010 | Wilken | A01N 1/0273 | |
| | | | 62/371 | |
| 7,845,508 B2* | 12/2010 | Rothschild | A45C 7/0054 | |
| | | | 190/107 | |
| 8,096,435 B2* | 1/2012 | Auclair | B65D 5/005 | |
| | | | 206/512 | |
| 8,413,472 B2* | 4/2013 | Chiang | E05G 1/024 | |
| | | | 109/73 | |
| 8,844,739 B2* | 9/2014 | Holey | B65D 81/263 | |
| | | | 206/216 | |
| 2005/0145192 A1* | 7/2005 | Axelrod | A01K 1/033 | |
| | | | 119/499 | |
| 2006/0037554 A1* | 2/2006 | Axelrod | A01K 31/08 | |
| | | | 119/499 | |
| 2008/0121188 A1* | 5/2008 | Axelrod | A01K 1/0245 | |
| | | | 119/499 | |
| 2011/0306272 A1* | 12/2011 | Ferguson | A01K 47/06 | |
| | | | 449/25 | |
| 2012/0031897 A1* | 2/2012 | Robinson | B65D 11/1833 | |
| | | | 220/6 | |
| 2013/0005216 A1* | 1/2013 | Rittberger | A01K 47/00 | |
| | | | 449/13 | |
| 2013/0146591 A1* | 6/2013 | Miller | B65D 11/1893 | |
| | | | 220/4.29 | |
| 2014/0290660 A1* | 10/2014 | Blair | A01K 1/031 | |
| | | | 128/205.26 | |
| 2014/0295733 A1* | 10/2014 | Waite | A01K 1/0245 | |
| | | | 449/13 | |
| 2015/0041463 A1* | 2/2015 | Liu | B65D 11/20 | |
| | | | 220/4.24 | |
| 2015/0076143 A1* | 3/2015 | Ryan | B65D 1/225 | |
| | | | 220/4.28 | |

FOREIGN PATENT DOCUMENTS

| | | | | |
|---|---|---|---|---|
| DE | 7923328 U1 * | 11/1979 | | B65D 11/1866 |
| DE | 3312176 A1 * | 10/1984 | | B65D 11/188 |
| DE | 29510332 U1 * | 9/1995 | | B65D 11/1866 |
| FR | 2274513 A1 * | 1/1976 | | B65D 11/188 |
| FR | 2397334 A1 * | 2/1979 | | B65D 11/188 |
| FR | 2659062 A1 * | 9/1991 | | B65D 5/2047 |
| WO | WO-2006037997 A1 * | 4/2006 | | B65D 11/1893 |
| WO | WO 2007004315 A1 * | 1/2007 | | B29C 45/1635 |

* cited by examiner

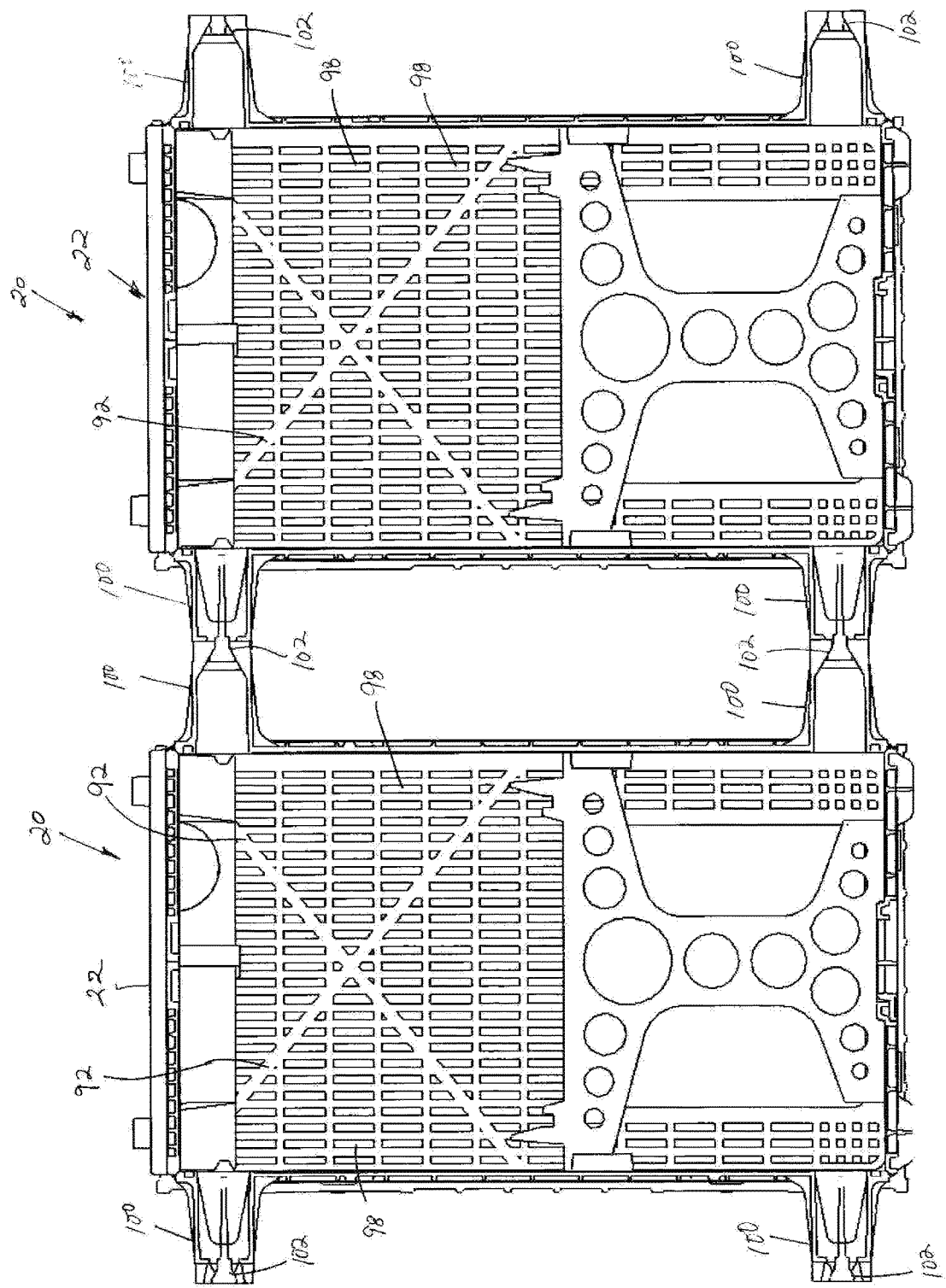

STACKABLE PACKAGE AND SYSTEM FOR HOLDING AND TRANSPORTING HONEYBEES

This application claims the benefit of U.S. Provisional Application No. 61/906,161, filed Nov. 19, 2013.

TECHNICAL FIELD

The invention relates generally to a package and system for holding and transporting small living beings, particularly, insects such as honeybees and the like, which is robust for handling and transport by mail and commercial carriers, including for supporting other packages and items thereon; that provides for air flow through and about the package for heat dissipation for proper honeybee environment; that accommodates food and separately carrying a queen bee; and that can be optionally configured in a non-operational, generally flat configuration for initial sale, transport, and storage.

BACKGROUND ART

U.S. Provisional Application No. 61/906,161, filed Nov. 19, 2013 is incorporated herein by reference in its entirety.

It is known to transport small living beings by mail and commercial carriers. Honeybees, as one example, are commonly transported via these modes to replace winter lost colonies or to increase apiaries. Honeybees tend to cluster in captivity and the clusters are exothermic. As a result, overheating of the clusters can be deadly to the bees. In any kind of package or container for transporting honeybees, maintaining internal temperature within a safe range is critical to survival of the bees. In this regard, one manner of maintaining temperature is to provide air flow or circulation about and/or through the container, while providing sufficient enclosure for preventing escape of the bees, and stinging of persons handling the container. To achieve these ends, currently, a commonly used package authorized for official mail use comprises a wood frame box having two open sides covered with screen wire. A large opening is provided in one end for receiving a can containing food. A separate smaller container can be provided for the queen bee. Shortcomings of a package of this type include the labor content and expense in its manufacture, the bulk and weight of the wood frame, and that it does not break down for storage and return shipping. As a result, substantial space is required for storing numerous packages, the packages are often damaged during storage, or are discarded after one use. Handlers must also be careful to not touch the screen wire covering when the package contains bees, or to damage the screen so that the bees can escape. Another problem encountered with using common hardware screen wire mesh, is that small hive beetles, a known invasive species, are often present in hives, and can be transferred to the package with the bees, but then cannot escape prior to transport because they cannot pass through the mesh. This results in the transport of the beetles from state to state.

As another concern, any package for potentially stinging insects such as bees should securely contain the insects, including when the package is subjected to relatively high load conditions, such as when supporting numerous other packages and articles stacked thereon during shipping, and in the event shipping loads shift and other packages fall onto or press against the package. A sturdy wood frame package will typically meet this need but is bulky, expensive, and heavy.

What is sought therefore is an improved manner of transportation of small insects and other living beings, particularly honeybees, that provides adequate air flow for cooling when required, protection against stings, while allowing escape of hive beetles, provides food and queen bee containment, is sufficiently strong and sturdy for stacking, and is optionally capable of configuring in a non-operational generally flat state for initial sale, transport, and storage.

SUMMARY OF THE INVENTION

What is disclosed is a package and system for holding and transporting small living beings, particularly, insects such as honeybees and the like, that provides adequate air flow for cooling when required, protection against stings, while allowing escape of hive beetles, provides food and queen bee containment, is sufficiently strong and sturdy for stacking, and is optionally capable of configuring in a non-operational generally flat state for initial sale, transport, and storage.

According to a preferred aspect of the invention, the transport package comprises a plurality of generally flat panels that assemble into a sturdy polygonal shape structure able to support several times its weight in the form of externally applied loads, while retaining its shape, which applied loads can comprise side and diagonally applied external loads in combination with vertical loads, anticipated to be exerted under a wide variety of shipping conditions. The panels are preferably of a plastics material, e.g., of integral or unitary molded construction, and at least some of the panels include a plurality of openings therethrough, the individual openings having a minimum extent at least marginally smaller than the small living beings, e.g., bees, to prevent their passage through the openings and stinging through the panels, but large enough for passage of smaller insects, particularly hive beetles, and large enough and numerous enough to provide adequate ventilation for the contained beings, including for cooling purposes.

According to another preferred aspect of the invention, the package comprises a polygonal shape structure including a plurality of angularly related, generally flat, substantially rigid panels, the panels including a first plurality of edge joints connected together by integral living hinges, and a second plurality of edge joints lockingly connected together by locking elements, defining and enclosing an interior cavity configured to hold a plurality of the honeybees. The package can include a food container of rigid construction disposed in the cavity and cooperatively engaged and integrated with at least one of the panels to strengthen the polygonal structure against crushing while providing a food source for the honeybees.

According to another preferred aspect of the invention, the second plurality of edge joints are disposed on opposite ends of the polygonal shape structure, and the locking elements comprise receptacles along predetermined edges of the panels, that lockingly receive other predetermined edges of the panels to hold the second plurality of edge joints together and impart and hold the structure in the polygonal shape. As another preferred aspect of the invention, the receptacles are incorporated in a U-shape or rectangular skeletal frame integral with end ones of the panels of the polygonal structure, respectively. As another aspect, at least some of the panels comprise integral braces extending diagonally thereacross relative to the predetermined edges. As still another preferred aspect, the package comprises a detachable or openable cover lockingly attached to at least one of the panels in covering relation to an opening through which the food container can be inserted into and removed from the package.

As a preferred aspect of the system of the invention, the transport package includes stand offs extending in at least one direction, to provide an air flow path to and at least partially about the package when amongst other packages, such as when in a shipping truck, parcel delivery van, or the like. As another aspect of the invention, the stand offs can include locking elements configured to lockingly engage stand offs of another of the transport packages for joining the packages together in a sturdy, spaced apart arrangement, to form a stack that can be oriented upwardly and downwardly, or sidewardly. The stand offs are also advantageous for providing specified space for air flow about and between the packages, and for cooling. As a non-limiting example, from two to several, e.g., 5-6, of the packages can be connected in a row or stack, so as to be easily handled and carried as a unit.

BRIEF DESCRIPTION OF THE DRAWINGS

FIG. 17 is an end view of the two transport packages.

DISCLOSURE OF PREFERRED EMBODIMENTS OF THE INVENTION

Figure 1:
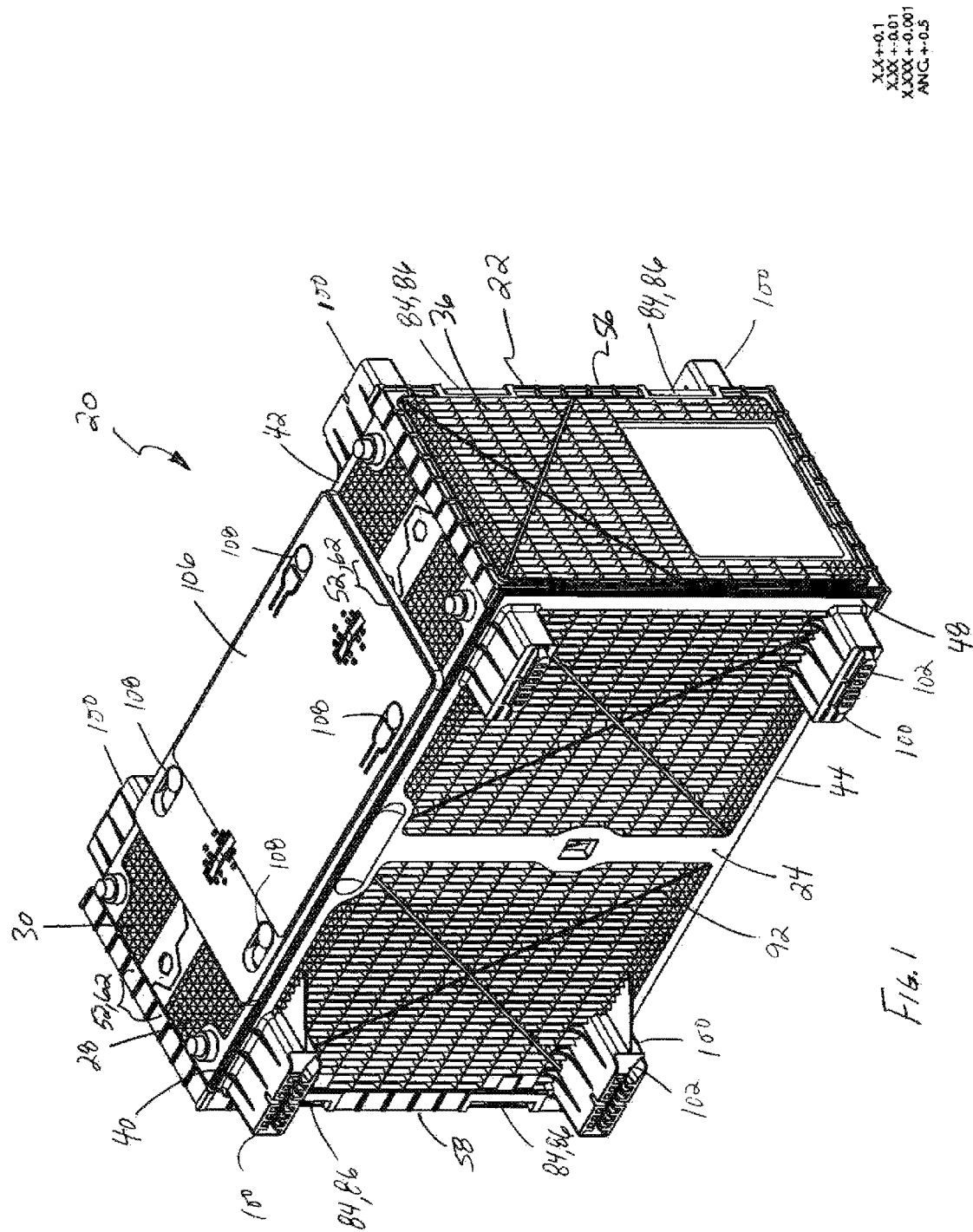
FIG. 1 is a perspective view of a transport package according to the invention.
Figure 2:
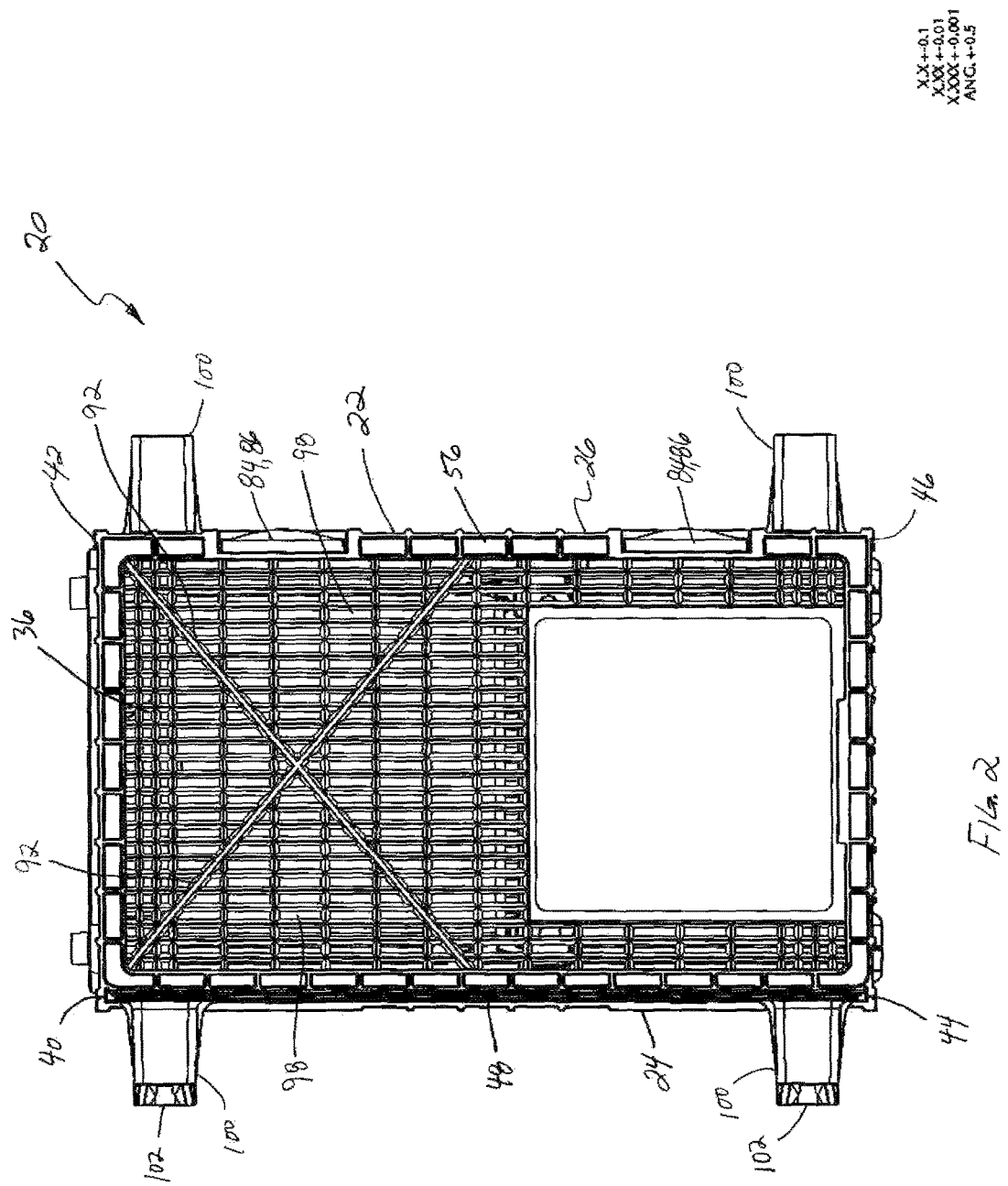
FIG. 2 is an end view of the transport package of FIG. 1.
Figure 3:
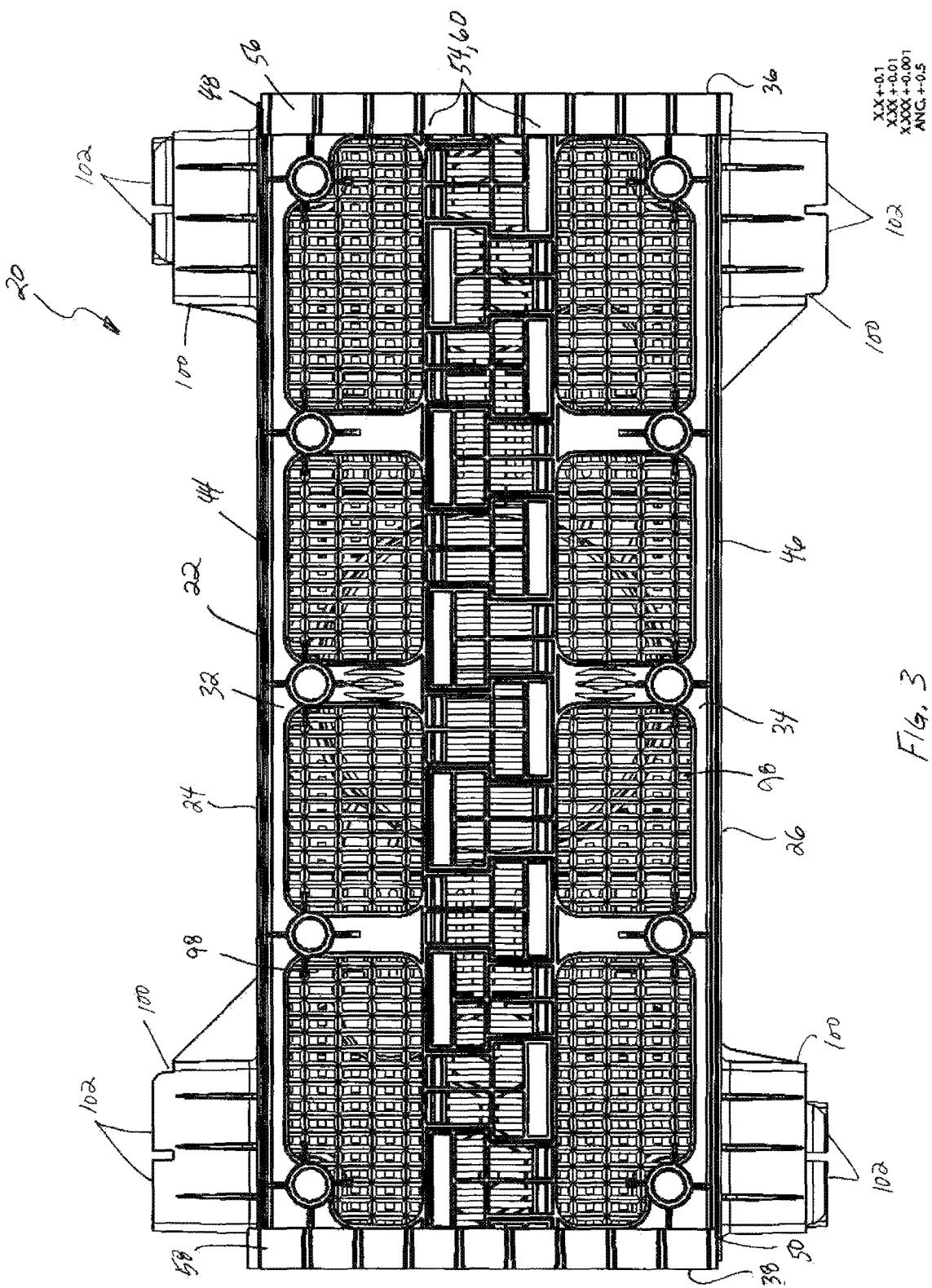
FIG. 3 is a bottom view of the transport package.
Figure 4:
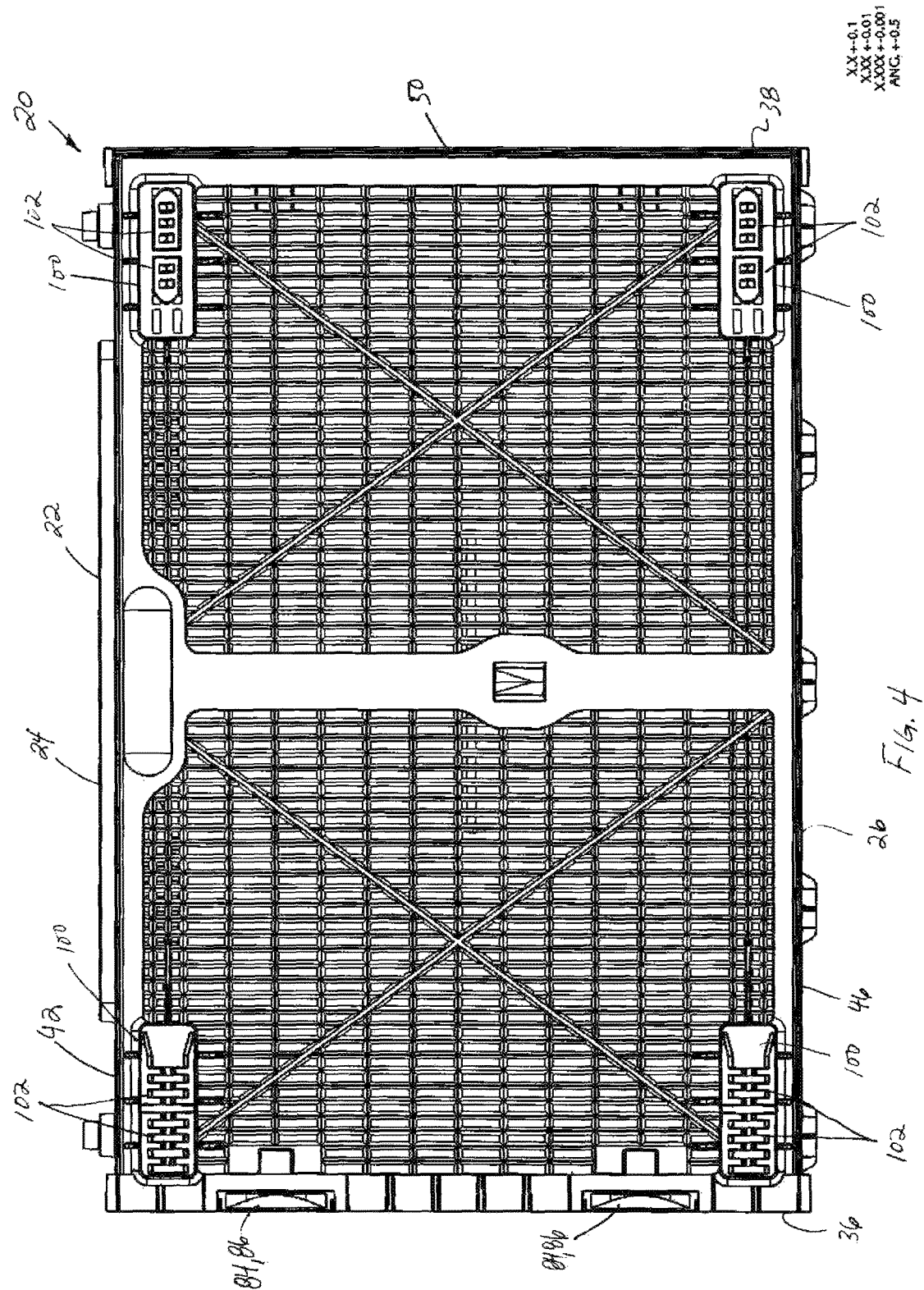
FIG. 4 is a side view of the transport package.
Figure 5:
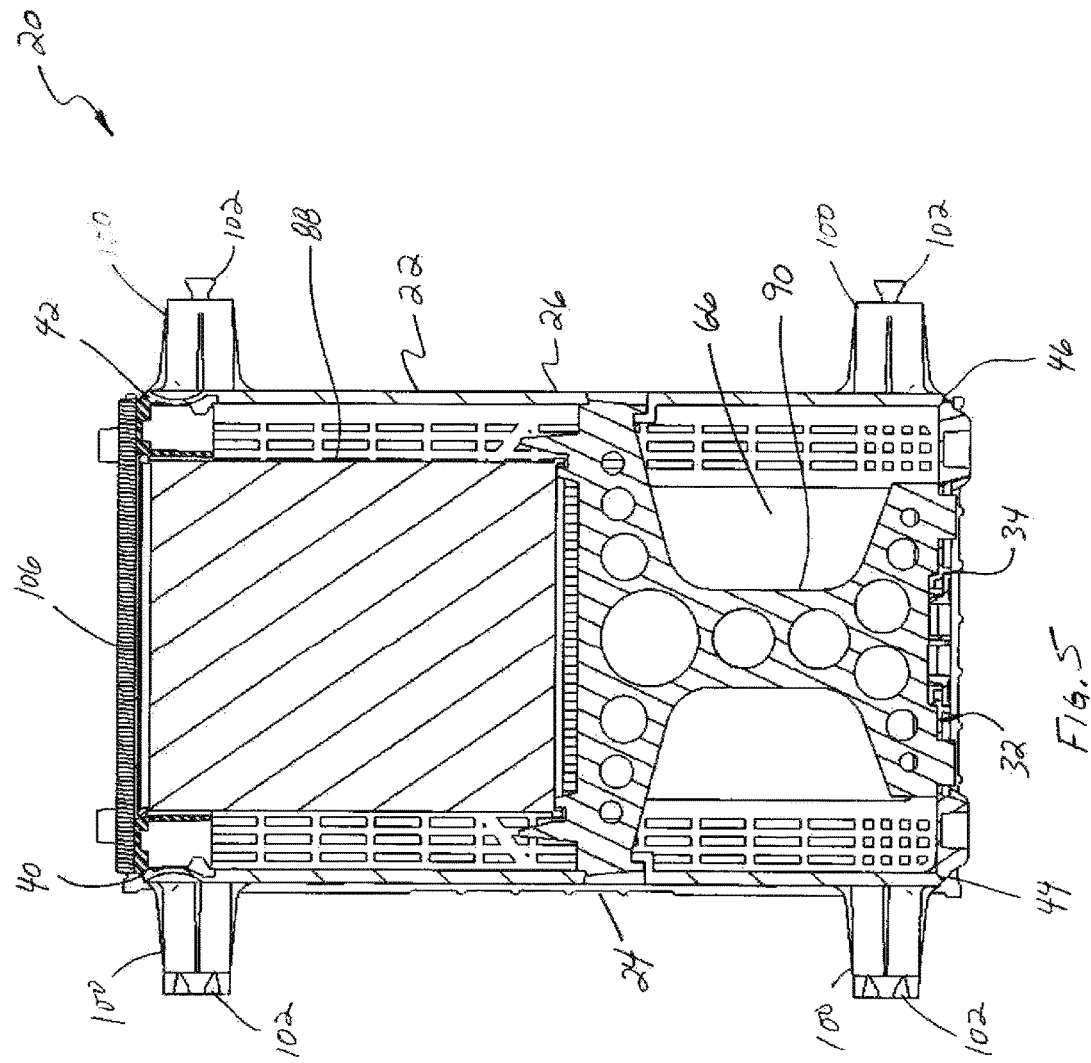
FIG. 5 is a sectional view of the transport package.
Figure 6:
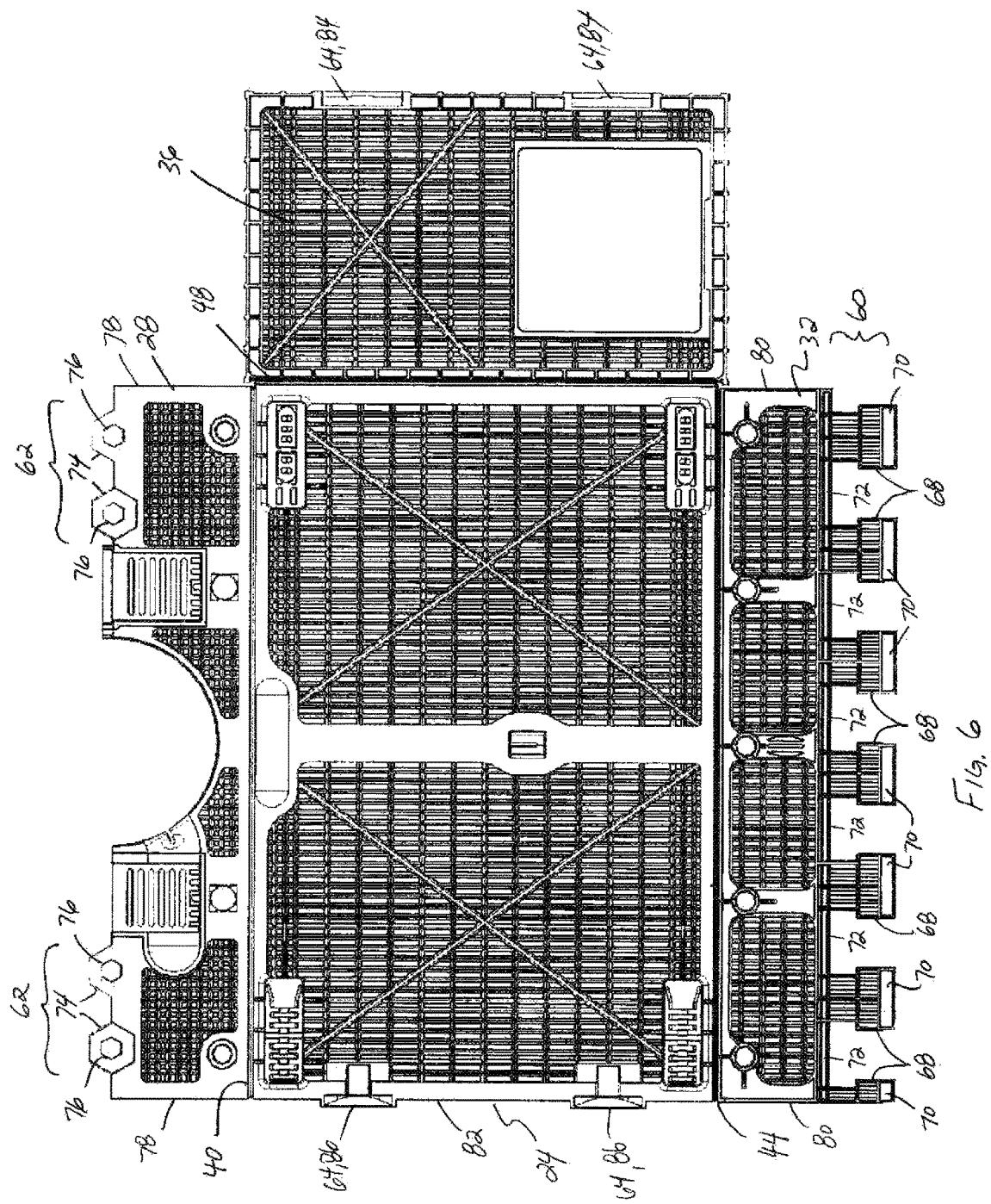
FIG. 6 is a plan view of a panel of the transport package.
Figure 7:
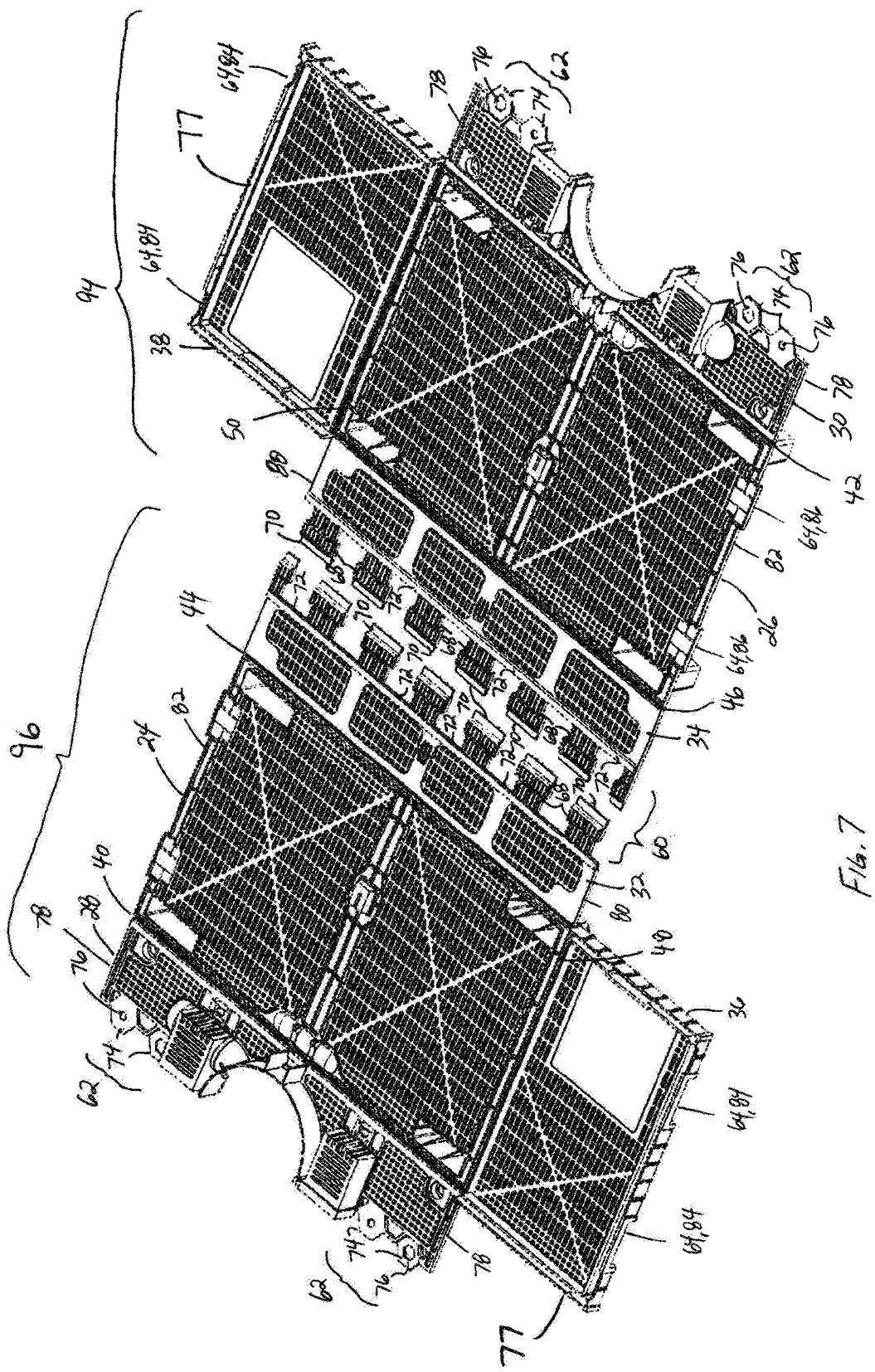
FIG. 7 is a perspective view of panels of the transport package ready for assembly.
Figure 8:
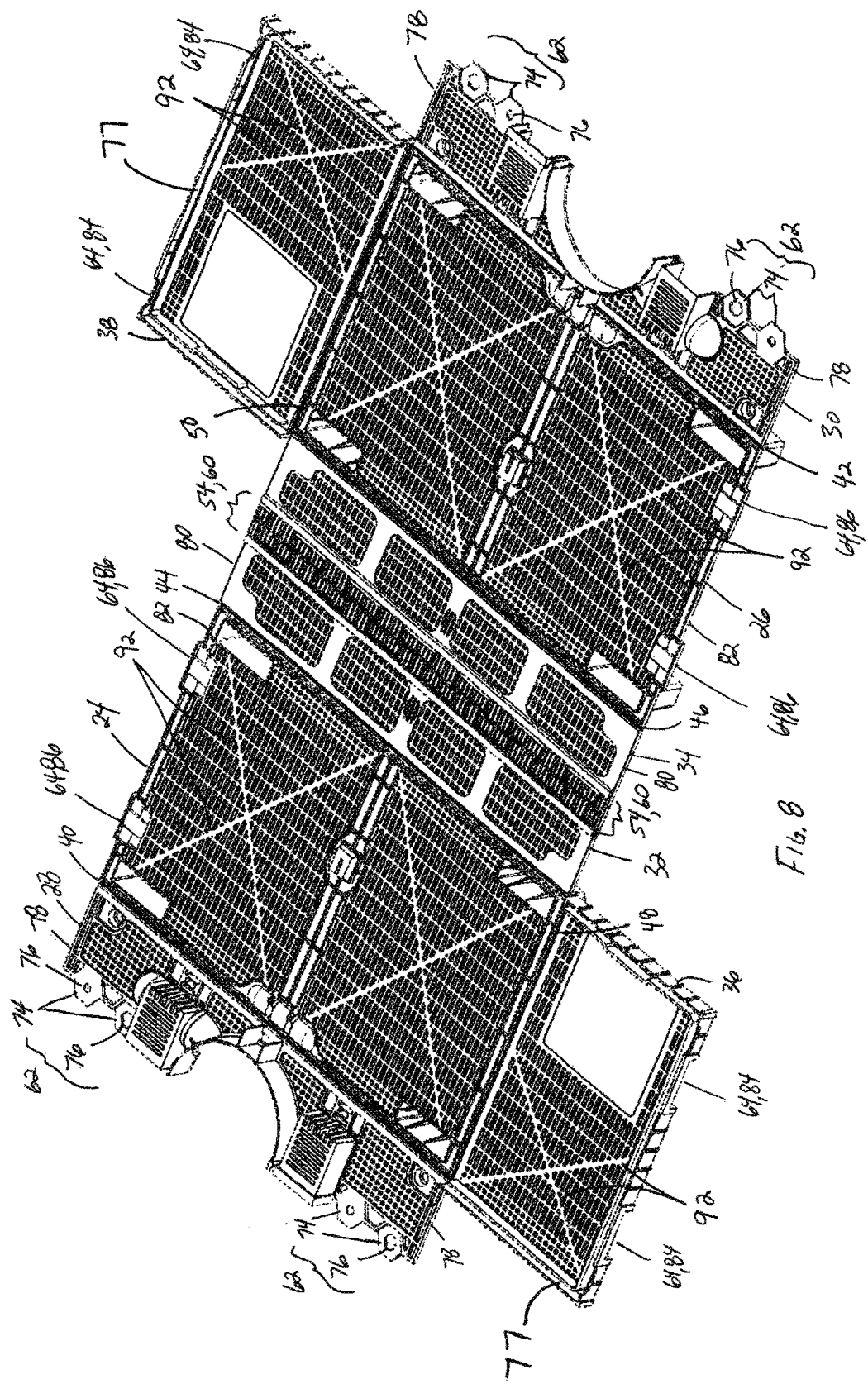
FIG. 8 is another perspective view of the panels of FIG. 7, joined together in an initial step of assembly.
Figure 9:
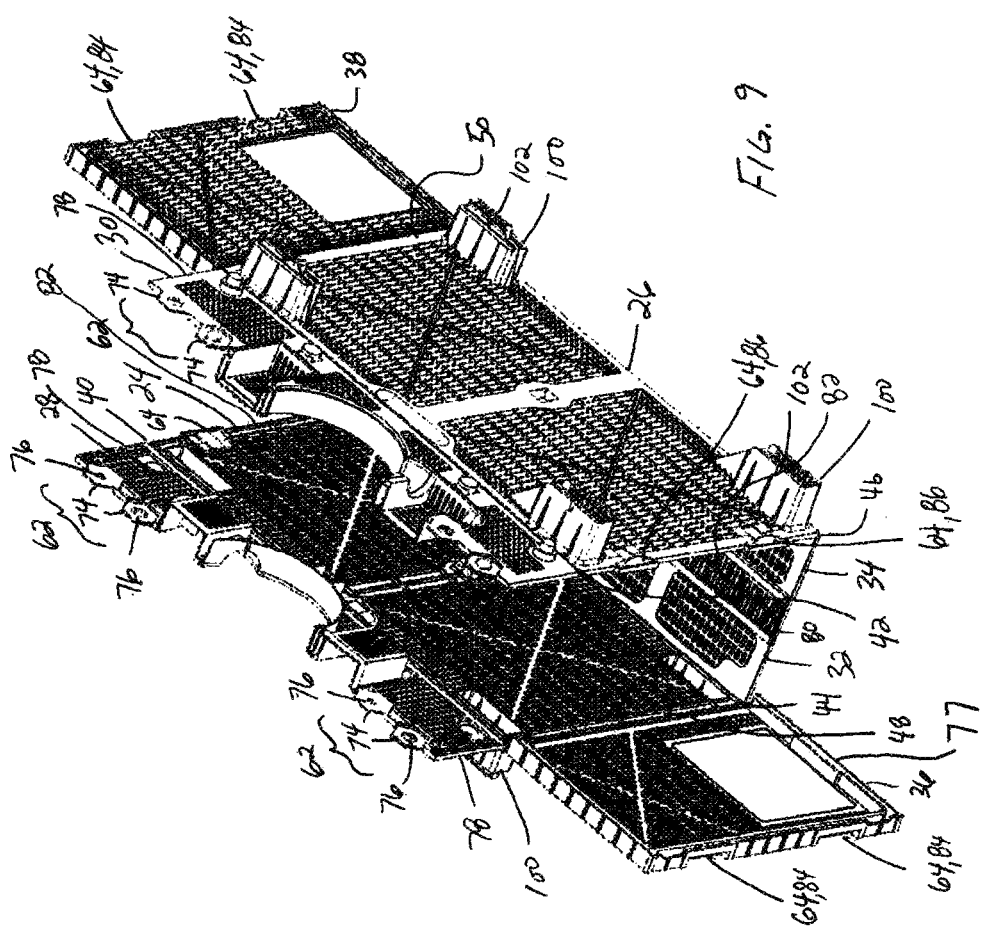
FIG. 9 is another perspective view of the panels joined together and folded along and joints thereof in a further step of assembly.
Figure 10:
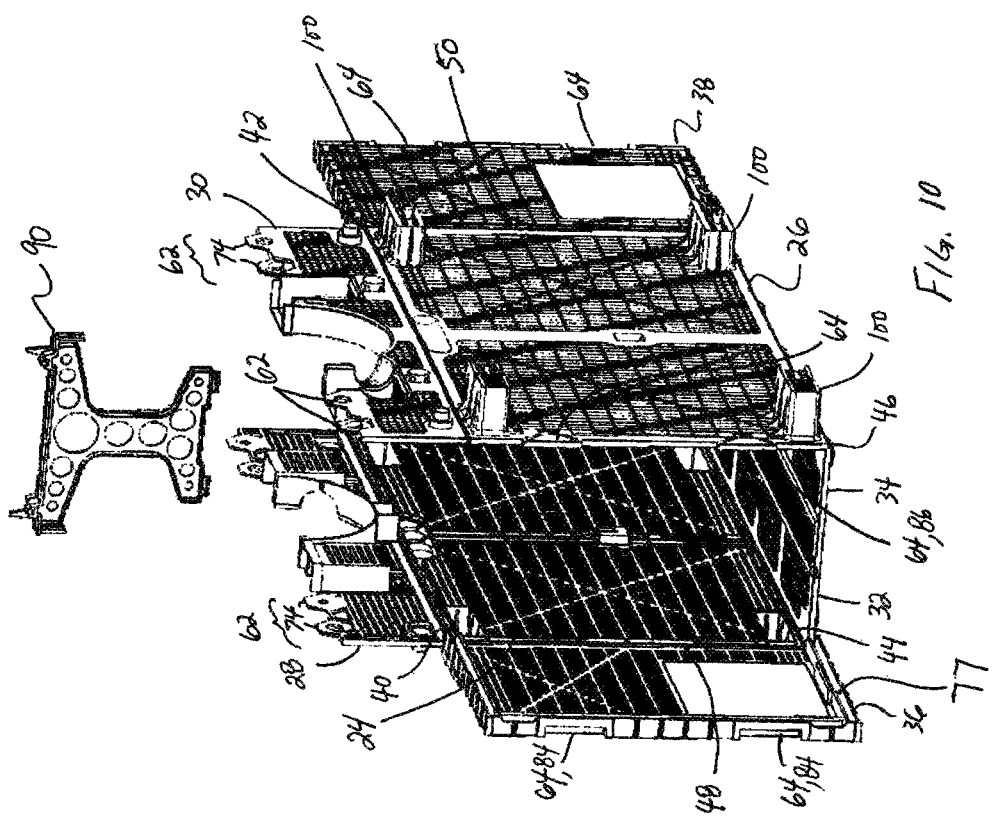
FIG. 10 is still another perspective view of the panels joined together and ready for installation of a center bracket thereto.
Figure 11:
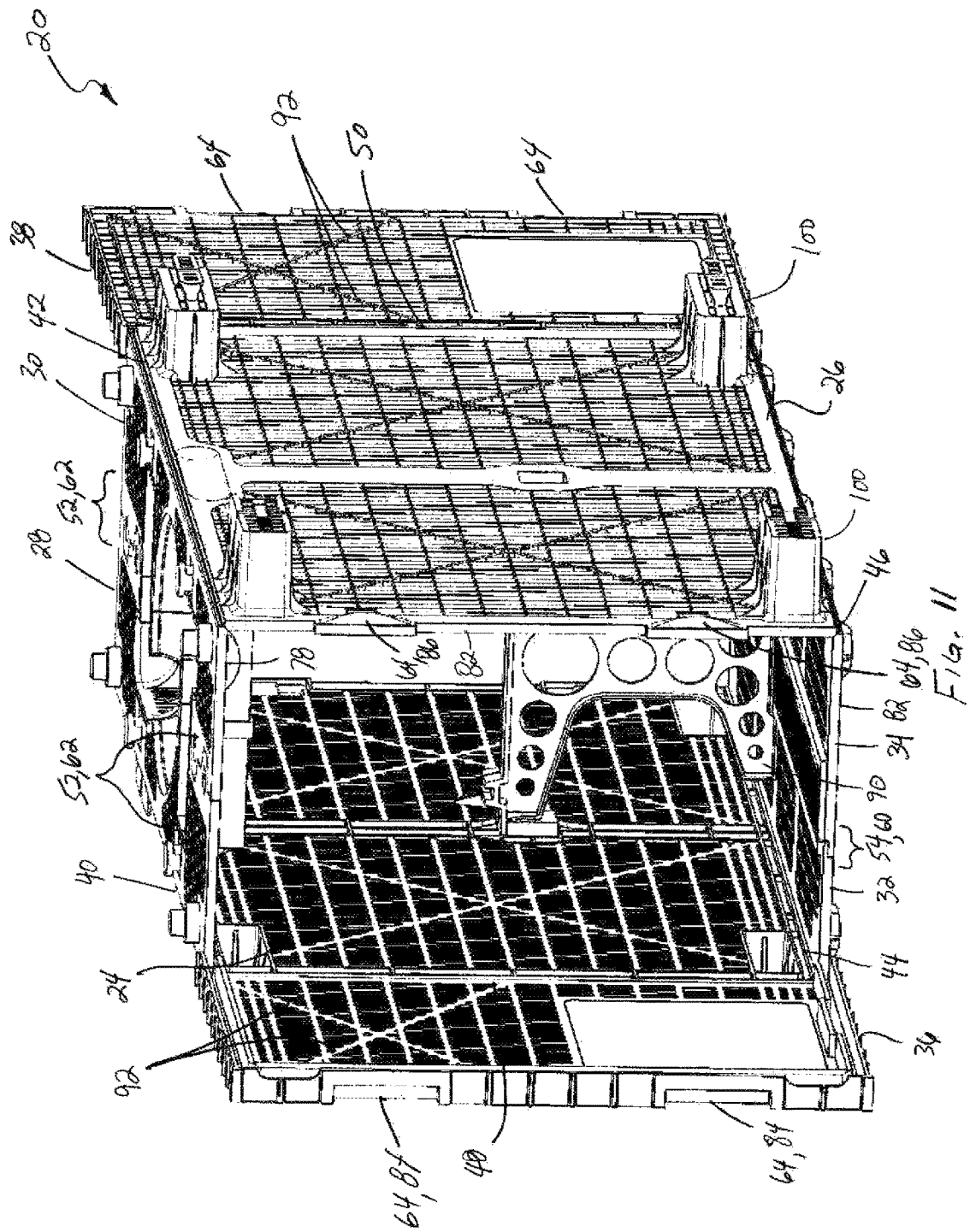
FIG. 11 is still another perspective view of the panels joined together in a further step of assembly with the center bracket installed.
Figure 12:
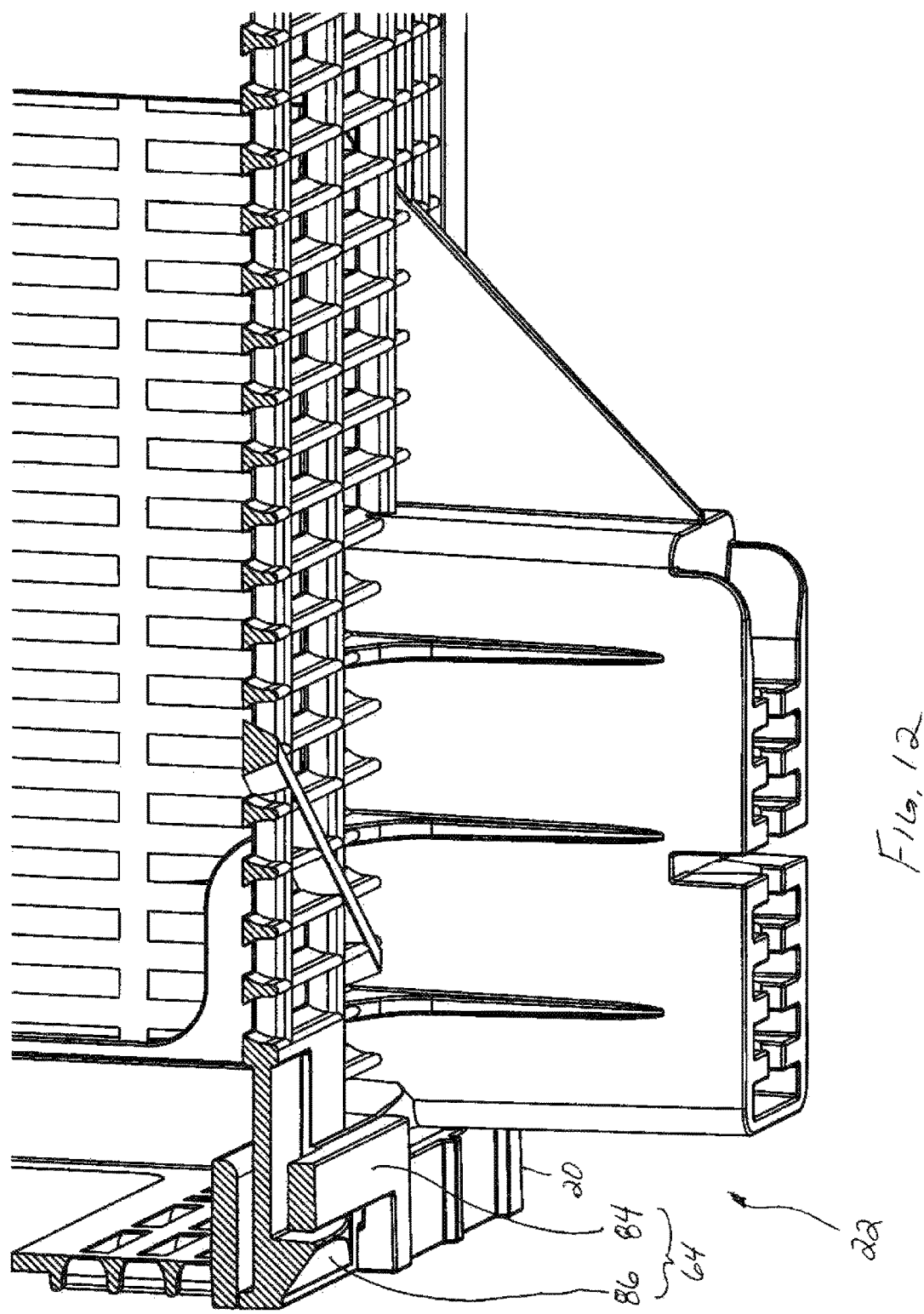
FIG. 12 is an enlarged fragmentary perspective view showing aspects for connecting the panels.
Figure 13:
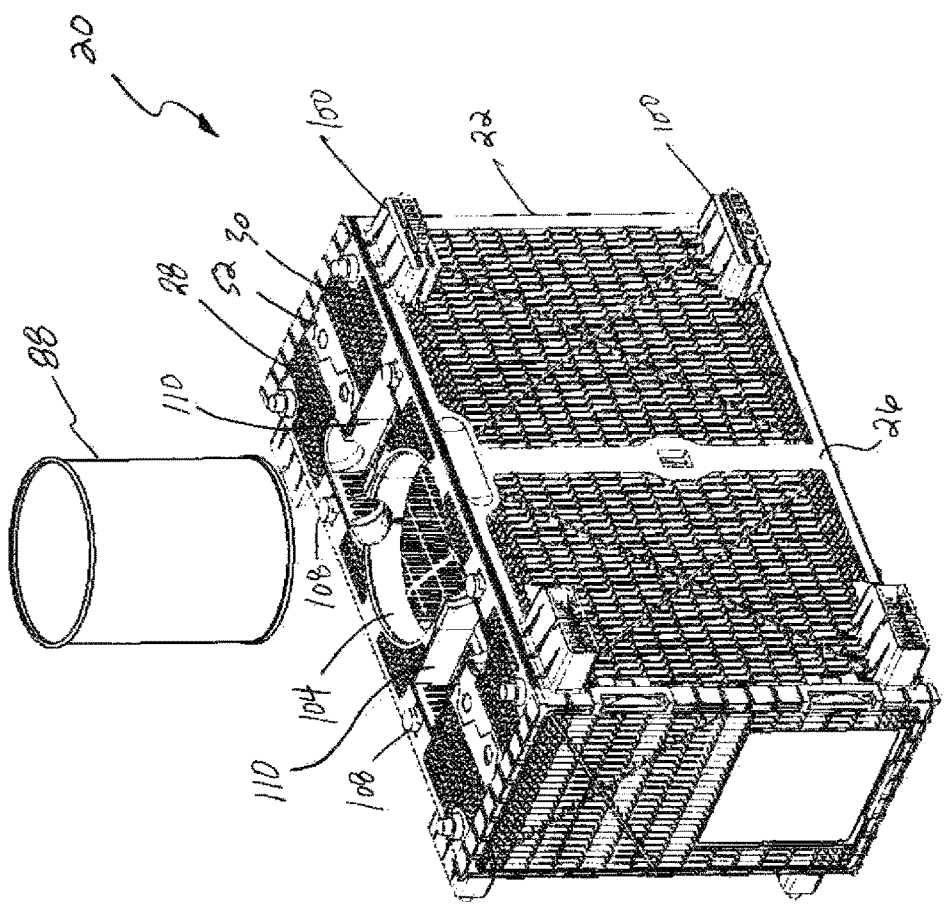
FIG. 13 is a perspective view of the assembled transport package, showing an associated food container installable in the package.
Figure 14:
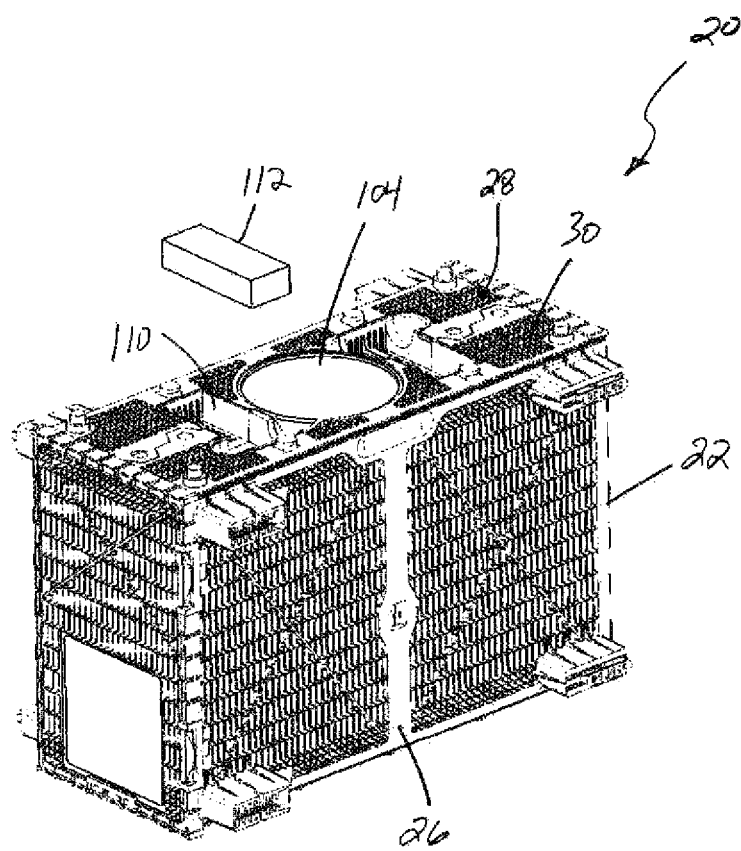
FIG. 14 is a perspective view of the assembled transport package, showing an associated queen bee container installable in the package.
Figure 15:
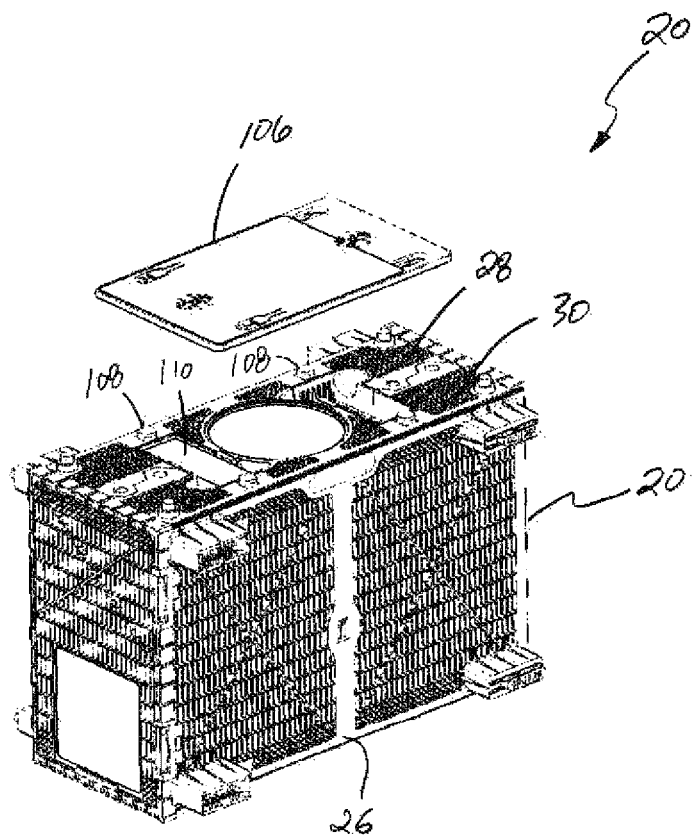
FIG. 15 is still another perspective view of the assembled transport package, showing an associated cover installable over the installed queen bee container and food container.
Figure 16:
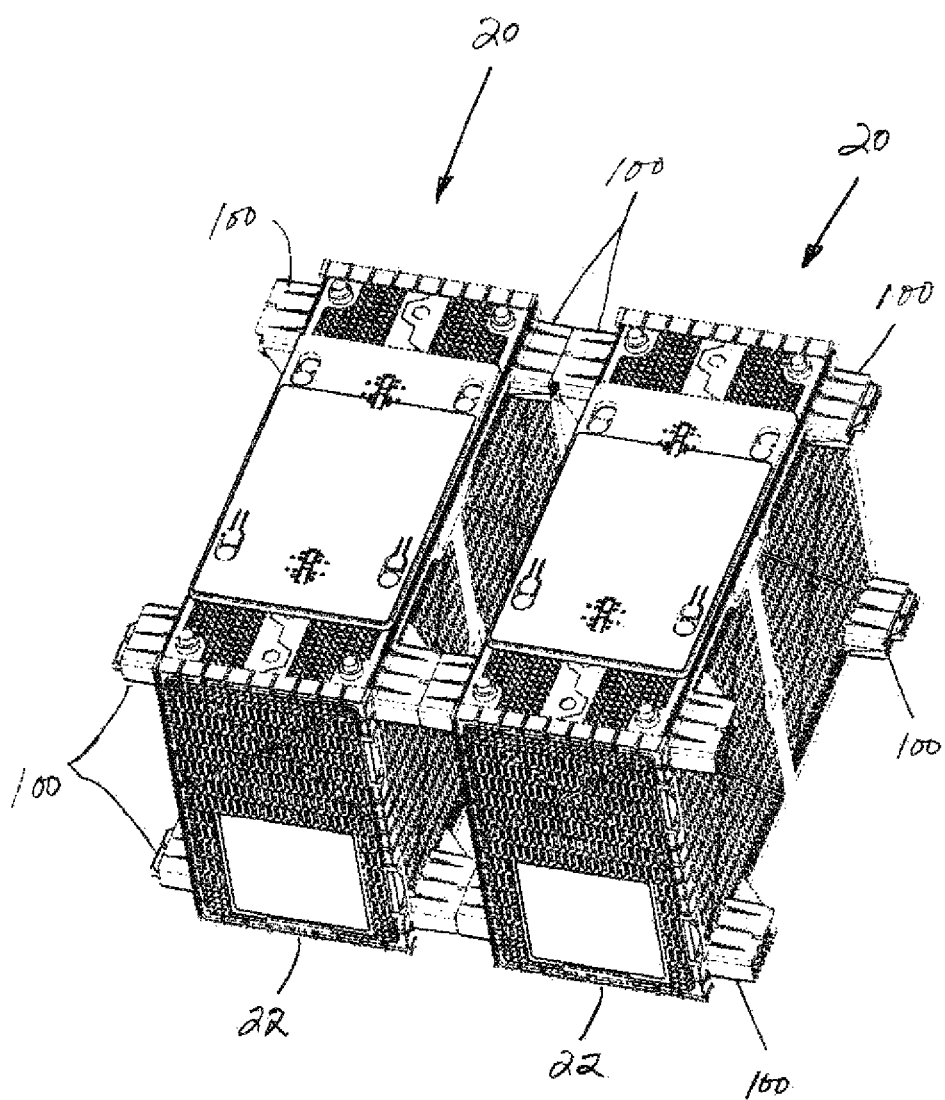
FIG. 16 is a perspective view of two of the transport packages, joined together by stand offs of the packages.

Referring now to the drawings, in FIGS. 1 through 17 what is shown and disclosed is an improved transport package 20 and system for transportation of small living beings, particularly honeybees, that is strong and sturdy, provides adequate air flow, protection against stings while allowing hive beetles to escape, food and queen bee containment, and which is optionally capable of configuring in a non-operational generally flat state for initial sale, transport, and storage, as well as other advantages.

Transport package 20 comprises a plurality of generally flat panels that assemble into a sturdy polygonal shape structure 22 able to support several times its weight in the form of externally applied loads, while retaining its shape, which applied loads can comprise side and diagonally applied external loads in combination with vertical loads, anticipated to be exerted under a wide variety of shipping conditions.

The package 20 in a preferred embodiment comprises a first side panel 24; a second side panel 26; a first top panel 28, a second top panel 30; a first bottom panel 32; a second bottom panel 34; a first end panel 36; and a second end panel 38, that rigidly interlock to form structure 22. Certain adjacent ones or pairs of the panels are connected together by a first plurality of joints, which here comprise flexible or hinged edge joints, including a first top edge joint 40; a second top edge joint 42; a first bottom edge joint 44; a second bottom edge joint 46; a first side edge joint 48; and a second side edge joint 50. As a result, in this configuration, one top panel, one bottom panel, and one end panel, are joined to integral with one side panel, in a unitary structure.

Each edge joint 40, 42, 44, 46, 48, and 50 preferably comprises a hinged or foldable or bendable element, such as, but not limited to, an integral living hinge, connecting the two associated panels, and allow positioning the associated panels in an angular relationship, which here, is a right angle for configuring the package in a rectangular shape, but alternatively, could be any required angle for achieving a desired overall shape of the package, e.g., triangular, pentagonal, hexagonal, etc. As advantages of this manner of connection, there is no gap between the associated panels; they won't separate under anticipated loading conditions including compression, tension, and shear; they simplify assembly; and they reduce possibility of loss of panels when disassembled.

Package 20 also includes a third top edge joint 52; a third bottom edge joint 54; a third side edge joint 56; and a fourth side edge joint 58, interlockingly connected together by locking elements 60 on the bottom panels; locking elements 62 on the top panels; and locking elements 64 on the side panels, to define and enclose an interior cavity 66 configured to hold a quantity of honeybees, insects, or other small living beings.

As non-limiting exemplary embodiments, locking elements 60 comprise interlocking rectangular fingers 68 with snap together detents 70 and 72 on each bottom panel 32, 34, which allow sliding together of the bottom panels for assembly and holding them securely together in generally flat or coplanar relation. Locking elements 62 on the top panels comprise overlapping interlocking hexagonal fingers 74 disposed along free edges of the top panels and include mating snap together buttons 76, to allow assembly with hinged or folding movement of panels 28, 30 with the bottom panels already assembled, to hold the top panels in a generally flat or coplanar relation. Alternatively, the top panels can be assembled first, if desired.

Locking elements 64 on end panels 36, 38 in combination with side edge joints 48 and 50 allow hinged or folding movement of those panels relative to their associated side panels to enclose the ends of interior cavity 66, and lockingly engage with top and bottom panels, 28, 30 and 32, 34 and the opposite side panel 24 or 26. Locking elements 64 here comprise rigid U- or rectangular shape receptacles 77 on end panels 36, 38 that cooperatively receive free edges 78, 80, and 82 on the associated top, bottom, and side panels to hold the top, bottom, and side panels in the angularly related relation (here, at right angles for the rectangular shape package), and include detent slots 84 that cooperatively receive and retain barbs 86, dovetail or other shape elements on the free edges to retain the edges in the receptacles 77. Because the free edges 78, 80, and 82 are essentially captured and contained in the receptacles 77, there is no line of sight openings or ability of the panels to flex or bend under anticipated loading conditions so as to provide a potential escape route for bees or other insects. This also prevents unlocking of the locking elements 60 and 62, respectively, and the separation of the top panels and the bottom panels under various anticipated loading conditions, including from rough handling and stacked loads, during transport via common carriers and the like. Again, as should be apparent, other angular relationships can be provided for packages of other shapes, e.g., triangular, hexagonal, etc.

As noted above, the panels when so connected and joined in the above manner, define and enclose an interior cavity 66 configured to hold a plurality of the honeybees. Package 20 includes a food container 88 disposed in cavity 66 and cooperatively engaged and integrated with at least one of the panels, here, the side panels, by utilization of an internal center support bracket 90 lockingly engaged with several of the panels within cavity 66. The configuration of the panels, the locking connections therebetween, particularly the stiff locking elements 64 on the ends, center support bracket 90, and the stiffness and integration of food container 88 into package 20, combine to provide a robust strong structure able to maintain its shape and integrity under anticipated handling and loading conditions, particularly compression and crushing loads when other packages and items are stacked on package 20 during commercial transport, side loads, and the like, while also providing a food source for the honeybees. In this regard, it can be observed that support bracket 90, by virtue of its connection with side panels 24 and 26 between the top and bottom panels, will prevent bowing of the center regions of the side panels. To additionally increase the strength and robustness, at least some of the panels include integral diagonal braces 92, to maintain and hold the panels flat and the overall polygonal shape of the package under the anticipated loading conditions.

As one preferred manner of construction, the structure is formed of at least one continuous sheet, and preferably two sheets 94, 96 (FIG. 7), each including a plurality of the panels 24 through 38, with appropriate adjacent ones of the panels, namely, one top panel, one side panel, and one bottom panel, being unitary in construction. The two sheets 94, 96 can also be symmetrical or identical and reversible for reducing molding costs if the panels are of a molded material such as a metal or plastics, and can be assembled in the above described manner.

The overall size of package 20 is contemplated to be sufficient for holding numerous honeybees, along with a food container, e.g., container 88, adequate for holding sufficient food for the duration of the transport and for providing adequate air flow for cooling the bees when clustered.

As another preferred aspect of the invention, panels 24-38 comprise a plastics material. Individual ones of the honeybees will have a minimum dimension, and at least some of the panels include a plurality of openings 98 therethrough, each of the openings 98 having a minimum dimension or extent at least marginally smaller than the minimum honeybee dimension yet larger than the smaller hive beetle dimension, combined with a thickness of the sheets 94 and 96 to provide required strength, so as to prevent passage of a honeybee therethrough but allow passage of the hive beetles; prevent fingers from being stung; and provide adequate air flow for cooling and other purposes. As a representative non-limiting example, opening having a width of about 0.1 inch or so, and sheets 94, 96 having a thickness of about 0.1 to about 0.2 inches, have been found to be suitable dimension-wise. As another non-limiting representative dimension, the individual ribs of the sheets between the openings 98 can have a dimension of between about 0.09 and 0.1 inch, and can have a tapered shape so that openings 98 taper convergingly toward the interior.

In relation to cooling, package 20 includes rigid, elongate stand offs 100 extending in at least one direction, here, two opposite directions. Stand offs 100 can be located at desired positions, such as at the corners of one or more sides of package 20, or other suitable locations. As another feature, stand offs 100 can include locking elements 102 configured to lockingly engage stand offs 100 of another of the transport packages 20 for joining the two or more packages together in spaced apart relation (by the combined lengths of the stand offs of the respective packages, in a stacked or side by side arrangement). Again, as a non-limiting example, these locking elements 102 can comprise detents, barbs, dovetails (shown), etc. Advantageously, as represented in FIG. 17, multiple packages 20, as a non-limiting example, 2-7, can be assembled into a rigid structure by lockingly engaging the locking elements 102 thereof, with air spaces of predetermined size between the adjacent packages, for ventilation and cooling. Such a structure will allow the packages to be kept together during shipping and handling, e.g., so as to be conveniently carried as stack or unit when loading and unloading a truck, parcel delivery van, or the like, to make the loading and unloading faster.

As a preferred embodiment, food container 88 is a rigid structure, such as, but not limited to, a conventional cylindrical metal or plastics food can enclosed on one end and open on another. Alternatively, the food container 88 can be a rectangular or other shape box of rigid construction, suitable for incorporation into package 20. As a preferred manner of incorporation into the package, the food container is insertable into, and removable from, the interior cavity via an opening 104 in one or more panels, here, top panels 28, 30, opening 104 being covered by a removable or openable, rigid cover 106 or a door, securable in position by locking elements 108, which here are keyhole slots and pins allowing sliding the cover into position and locking it in place over opening 104. The bees can also be inserted into the package and removed through the opening 104, before inserting the container 88.

Separate accommodations for a queen bee are provided if desired, preferably in the form of a recess or receptacle 110 for holding a small queen bee container 112 in communication with but separately of the interior cavity 66, and the separate container 112 can be held in place by the cover 106, e.g., located under it.

In light of all the foregoing, it should thus be apparent to those skilled in the art that there has been shown and described a STACKABLE PACKAGE AND SYSTEM FOR HOLDING AND TRANSPORTING HONEYBEES. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A transport package for honeybees, comprising:
   a first polygonal shape structure including a plurality of angularly related, generally flat, substantially rigid panels, the plurality of angularly related, generally flat, substantially rigid panels including:
      a first unitary structure comprising a first side panel, a first top panel, a first bottom panel, and a first end panel, connected together by integral living hinges, and
      a second unitary structure comprising a second side panel, a second top panel, a second bottom panel, and a second end panel, connected together by integral living hinges, the first unitary structure and the second unitary structure being connected by a plurality of edge joints lockingly connected together, defining and enclosing an interior cavity configured to hold a plurality of the honeybees,
   a rigid food container disposed in the cavity and cooperatively engaged and integrated with at least two opposing ones of the panels beside the food container to strengthen the polygonal structure against crushing while providing a food source for the honeybees,
   wherein the first bottom panel and the second bottom panel each include a plurality of fingers, the first bottom panel and the second bottom panel being connected together in generally coplanar relation by the fingers interlocking with each other and snapping together, closing all line of sight gaps therebetween, and
   wherein the first end panel and the second end panel each include locking elements that comprise U-shape receptacles extending about multiple edges of the end panels, respectively, that cooperatively receive edges of others of the panels, respectively, closing line of sight gaps therebetween and holding the polygonal shape structure in a polygonal shape.

2. The transport package of claim 1, further comprising rigid stand offs extending outwardly a predetermined distance from at least one of the panels of the polygonal shape structure.

3. The transport package of claim 2, comprising a second polygonal shape structure identical to the first polygonal shape structure, and wherein at least some of the stand offs of one of the polygonal shape structures comprise locking elements lockingly engaged in end to end relation with stand offs of the other of the polygonal shape structures such that the polygonal shape structures are joined together in spaced apart relation about equal to combined lengths of the lockingly engaged stand offs.

4. The transport package system of claim 3, wherein the small living beings comprise bees, and each of the packages comprises a food container within the interior cavity thereof accessible by the bees and connected to and incorporated in supportive relation to the panels for strengthening the package.

5. The transport package system of claim 3, wherein the packages are configured to be disconnected from each other and the folded substantially rigid panels thereof disconnected and unfolded to configure the packages in a generally flat configuration when not in use.

6. The transport package of claim 1, wherein at least one of the panels bounds a receptacle that holds a container configured to carry a queen bee separately from and in communication with the interior cavity.

7. The transport package of claim 1, wherein individual ones of the honeybees have a minimum dimension, at least some of the panels include a plurality of openings therethrough, and each of the openings has a minimum extent at least marginally smaller than the minimum dimension, so as to prevent passage of a honeybee therethrough.

8. The transport package of claim 7 wherein the minimum extent of at least one of the openings of the panels is at least marginally larger than a predetermined dimension of a hive beetle, to allow passage of hive beetles through the at least one of the openings.

9. The transport package of claim 7, wherein portions of the at least some of the panels having the openings extending therethrough, have a thickness of at least about 0.1 inch, to prevent a person handling the package from being stung by the honeybees through the openings.

10. The transport package of claim 1, wherein the first top panel and the second top panel each comprise detents or buttons, the first and second top panels being connected together by the detents or buttons of the first and second top panels snapping together in overlapping relation.

11. The transport package of claim 1, wherein at least some of the panels comprise integral braces extending diagonally thereacross.

12. The transport package of claim 1, further comprising a detachable or openable cover lockingly attached to at least one of the panels in covering relation to an opening through which a food container can be inserted into and removed from the package.

13. The transport package of claim 1, wherein the polygonal shape is rectangular.

14. The transport package of claim 1, wherein the first unitary structure comprises a unitary sheet bent or folded along the living hinges thereof into a portion of the polygonal shape structure.

15. The transport package of claim 1, wherein the first unitary structure and the second unitary structure comprise a plastics material.

16. The transport package of claim 1, further comprising a support bracket within the interior cavity and rigidly connected between at least two opposing ones of the panels and supporting a food container in the cavity.

17. The transport package of claim 16, further comprising a detachable cover lockingly attached to at least one of the panels in covering relation to an opening connecting with the interior cavity, retaining the food container in the cavity.

18. The transport package of claim 1, further comprising a second polygonal shape structure identical to the first polygonal shape structure, the polygonal shape structures including the plurality of angularly related, generally flat, substantially rigid panels having openings therethrough, the polygonal shape structures comprising locking elements extending outwardly therefrom on stand offs, respectively, and the locking elements extending from the stand offs being lockingly engaged in end to end relation such that the polygonal shape structures are joined together in spaced apart relation about equal to combined lengths of the stand offs.

19. The transport package of claim 1, wherein the edge joints overlap or comprise elements that substantially close all gaps between the second plurality of edge joints lockingly connected together.

20. The transport package of claim 1, further comprising stand offs extending outwardly a predetermined distance from at least one of the panels.

21. The transport package of claim 1, wherein at least one of the panels bounds a recessed receptacle configured to hold a container carrying a queen bee separately from and in communication with the interior cavity.

* * * * *